(12) United States Patent
Xu et al.

(10) Patent No.: US 11,938,614 B2
(45) Date of Patent: Mar. 26, 2024

(54) CONTROL DEVICE FOR ROBOT TO TEASE PET AND MOBILE ROBOT

(71) Applicant: AMICRO SEMICONDUCTOR CO., LTD., Guangdong (CN)

(72) Inventors: Dengke Xu, Guangdong (CN); Xinqiao Jiang, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 394 days.

(21) Appl. No.: 17/415,751

(22) PCT Filed: Nov. 9, 2019

(86) PCT No.: PCT/CN2019/116897
§ 371 (c)(1),
(2) Date: Jun. 18, 2021

(87) PCT Pub. No.: WO2020/125266
PCT Pub. Date: Jun. 25, 2020

(65) Prior Publication Data
US 2021/0383114 A1 Dec. 9, 2021

(30) Foreign Application Priority Data
Dec. 20, 2018 (CN) .......................... 201811565759.9

(51) Int. Cl.
G06K 9/00 (2022.01)
A01K 15/02 (2006.01)
B25J 11/00 (2006.01)
G06F 18/22 (2023.01)
G06K 9/62 (2022.01)
(Continued)

(52) U.S. Cl.
CPC ............. B25J 11/00 (2013.01); A01K 15/021 (2013.01); A01K 15/025 (2013.01); G06F 18/22 (2023.01);
(Continued)

(58) Field of Classification Search
CPC ....... B25J 11/00; G06V 40/197; G06V 40/19; G06V 20/10; G06V 40/20; G06F 18/22;
(Continued)

(56) References Cited

U.S. PATENT DOCUMENTS

| 9,131,660 | B2 | 9/2015 | Womble |
| 2014/0267720 | A1 | 9/2014 | Lee |
| 2018/0271065 | A1 | 9/2018 | Chu |

FOREIGN PATENT DOCUMENTS

| CN | 101278654 A | 10/2008 |
| CN | 104969875 A | 10/2015 |

(Continued)

Primary Examiner — David F Dunphy
(74) Attorney, Agent, or Firm — Samson G. Yu

(57) ABSTRACT

The disclosure discloses a control device for a robot to tease a pet and a mobile robot. The primary sensor is configured to continuously collect a preset number of frames of pet motion images in each motion cycle. The state recognizer is configured to judge the matching between the pet motion images continuously collected by the primary sensor and a pre-stored digital image of pet behavior, and then parse a matching result into behavior state parameters of a pet. The behavior interferometer is configured to adjust and control a behavior state of the pet according to the behavior state parameters and an additional road sign image provided by the secondary sensor. The laser projector is configured to project a laser beam to form a structural light spot, so that the pet changes toward the behavior state adjusted by the behavior interferometer.

14 Claims, 1 Drawing Sheet

(51) Int. Cl.
　　　*G06T 7/20*　　　(2017.01)
　　　*G06V 20/10*　　(2022.01)
　　　*G06V 40/18*　　(2022.01)
　　　*G06V 40/19*　　(2022.01)
　　　*G06V 40/20*　　(2022.01)
　　　*H04N 9/31*　　 (2006.01)

(52) U.S. Cl.
　　　CPC .............. *G06T 7/20* (2013.01); *G06V 20/10* (2022.01); *G06V 40/19* (2022.01); *G06V 40/197* (2022.01); *G06V 40/20* (2022.01); *H04N 9/3132* (2013.01); *G06T 2207/10048* (2013.01)

(58) Field of Classification Search
　　　CPC ...... A01K 15/021; A01K 15/025; G06T 7/20; H04N 9/3132
　　　See application file for complete search history.

(56) References Cited

FOREIGN PATENT DOCUMENTS

| | | | | |
|---|---|---|---|---|
| CN | 204697710 U | 10/2015 | | |
| CN | 105303583 A | 2/2016 | | |
| CN | 105957140 A | 9/2016 | | |
| CN | 106462924 A | 2/2017 | | |
| CN | 106888985 A | 6/2017 | | |
| CN | 107263493 A | 10/2017 | | |
| CN | 107455282 A | 12/2017 | | |
| CN | 107717992 A | 2/2018 | | |
| CN | 207220767 | * | 4/2018 | .............. A47L 11/24 |
| CN | 108366343 A | 8/2018 | | |
| CN | 109514582 A | 3/2019 | | |
| KR | 20170135195 A | 12/2017 | | |

* cited by examiner

CONTROL DEVICE FOR ROBOT TO TEASE PET AND MOBILE ROBOT

CROSS REFERENCE TO RELATED APPLICATIONS

The present disclosure claims priority of Chinese Patent Application No. 201811565759.9, filed on Dec. 20, 2018, entitled "Control device for robot to tease pet and mobile robot", the contents of which are hereby incorporated by reference in its entirety.

TECHNICAL FIELD

The disclosure belongs to the technical field of robots, and in particular to a control device for a robot to tease a pet and a mobile robot.

BACKGROUND

Nowadays more and more families want to keep pets, but when family members are out to work, the pets are left alone without care. Unattended pets may become uncontrollable and make a mess of the home or even damage furniture. With the improvement of life quality, people's demand for pets is getting stronger and stronger, and the uncontrollable behavior of pets when they are alone at home has become the biggest concern for people to keep pets. At present, most of the solutions to restrain the behavior of pets when unattended are to lock them up somewhere, or foster them to some pet care services that also lock them up. These methods of behavior restraint are not good for pets. In addition, pets have their own living habits, including eating, drinking, sleeping time and frequency, as well as conditional stimuli to happiness, anger, or fear, so how to accurately predict and summarize the respective living habits and growth characteristics of pets, so as to get pets to exercise regularly is a problem to be solved. In this way, the interference of human cognitive error to pets, which causes the maladjustment or resistance phenomenon, is reduced, and pet feeding is automatically controlled remotely.

SUMMARY

A control device for a robot to tease a pet is provided, which includes a primary sensor, a state recognizer, a behavior interferometer and a laser projector which are integrated. The primary sensor is configured to continuously collect a preset number of frames of pet motion images in each motion cycle and transmit them to the state recognizer in turn. The state recognizer is configured to judge the matching between the pet motion images continuously collected by the primary sensor and a pre-stored digital image of pet behavior, and then parse the matched digital image of pet behavior into behavior state parameters of pets and transmit the behavior state parameters to the behavior interferometer. The behavior interferometer is configured to adjust and control the behavior state parameters of pets according to an additional road sign condition of the home environment where the pet is and according to historical behavior state of the pet, so as to avoid additional road signs of the home environment, and transmit the adjusted behavior state parameters to the laser projector. The laser projector is configured to move a laser beam to form a structural light spot, so that motion state of the pet changes towards the motion state corresponding to the adjusted behavior state parameters in the process of following the structural light spot, and then adjusted behavior state parameters is collected and processed in real time by the primary sensor, and the adjusted motion state is recorded as the historical behavior state. The control device for a robot to tease a pet further includes a secondary sensor, configured to assist the primary sensor to identify the current motion state of the pet. The secondary sensor includes an infrared camera, configured to sense an additional road sign image corresponding to the home environment where the pet is and transmit the additional road sign image to the behavior interferometer, which is defined in the behavior interferometer as an additional road sign condition of the home environment where the pet is. The secondary sensor effectively avoids that the pet behavior state parameters are interfered, resulting in misjudgment and missed detection. The control device for a robot to tease a pet reduces the interference of the outside road signs and improves the degree of intelligence of pet training by accurately predicting the behavior of the pet. Besides, the integration degree of module units of each internal device is high, and the stability and real-time performance of the whole system are good.

Furthermore, the behavior state parameters are motion frequency and amplitude of the pet which are obtained by converting and parsing the matched digital image of pet behavior by the state recognizer. The technical solution may improve the accuracy of analysis through the identification of a pet and the analysis of an image change.

Furthermore, the primary sensor includes an iris camera, configured to capture the iris in the pet's eyes to sense the image corresponding to the behavior state of the pet. The primary sensor has a higher functional integration level, and better stability and real-time performance, so that the iris recognition is more accurate.

Furthermore, the state recognizer is further configured to judge a matching degree between an iris image collected by the iris camera and a pre-stored sample pet iris. The state recognizer analyzes and compares data by extracting a stored iris template, thus improving the accuracy of iris recognition.

Furthermore, the state recognizer is further configured to counteract the effect of the additional road sign image through the background, extract the pet motion image continuously collected by the primary sensor, perform corresponding matching between the continuously collected images, obtain the changes of the structural light spot in the motion cycle, and analyze according to the changes of the structural light spot to obtain the behavior of the pet to the structural light spot. In this way, that the pet behavior state parameters output by the state recognizer are interfered, resulting in misjudgment and missed detection, is avoided.

Furthermore, the laser projector includes a laser sensor which emits a laser signal in an infrared band by means of modulation. The technical solution uses structured light of the laser projector, which is better for attracting the attention of a pet.

Furthermore, the laser sensor is specifically configured to plan a motion track of the pet by controlling the movement of the structural light spot and then scan a coordinate map for guiding the behavior state of the pet in each preset time interval calculate the amount of movement according to the two coordinate maps at two different times and then measure a moving speed of the pet, and transmit the moving speed to the behavior interferometer; the behavior interferometer records the moving speed as the historical behavior state of the pet. The laser emitted by the laser sensor can not only simulate a predation behavior in the real nature, but also adjust a motion posture according to the motion amplitude of the pet, and analyze the size and speed of your pet and other parameters, so as to match a skill level and movement style of your pet.

A mobile robot is provided, in which the control device for a robot to tease a pet is built for training a pet. When a pet is in a cycle time, the mobile robot contacts and interacts with the pet, constantly records motion trails of the pet formed in each cycle time, and adjusts and controls the motion frequency and amplitude of the pet; furthermore, the integration degree of module units of each internal device is increased.

DETAILED DESCRIPTION OF THE EMBODIMENTS

The technical solutions in the embodiments of the disclosure are described in detail below in combination with the accompanying drawings in the embodiments of the disclosure. The following embodiments and characteristics in the embodiments may be combined without conflicts.

Figure 1:
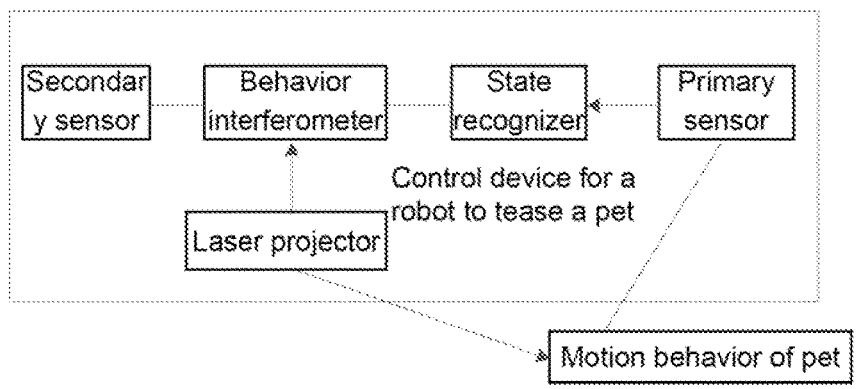
FIG. 1 is a module structure diagram of a control device for a robot to tease a pet provided in an embodiment of the disclosure.

With reference to FIG. 1, the embodiments of the disclosure provide a control device for a robot to tease a pet, which includes a primary sensor, a state recognizer, a behavior interferometer, a laser projector and a secondary sensor which are integrated.

The primary sensor is configured to continuously collect a preset number of frames of pet motion images in each motion cycle and transmit them to the state recognizer in turn. The motion cycle is related to the unique living habits of the pet. The preset number of frames of pet motion images matches with the motion frequency of the pet, and then the current behavior state of the pet is comprehensively evaluated by the state recognizer in turn. The primary sensor includes a CMOS camera, an iris camera for capturing a digital image of the iris of the pet's eye, a facial recognition camera for capturing a digital image of the pet, and an iris recognition sensor for recognizing the iris in the pet's eye.

The state recognizer is configured to judge whether the pet motion images continuously collected by the primary sensor in the current motion cycle match with a pre-stored digital image of pet behavior, and when the pet motion images continuously collected by the primary sensor in the current motion cycle match with a pre-stored digital image of pet behavior, parse the matched digital image of pet behavior into behavior state parameters of the pet and transmit the behavior state parameters to the behavior interferometer, or else, wait for the next motion cycle and then collect and judge the matching.

The behavior interferometer is configured to adjust the behavior state parameters that control the state of the pet according to an additional road sign condition of the home environment, where the pet is, sensed by the secondary sensor and in combination with historical behavior state information of the pet (including the behavior state parameters of the pet transmitted by the state recognizer), so as to avoid additional road signs of the home environment, and transmit the adjusted behavior state parameters to the laser projector; Generally speaking, the objects destroyed by the pet are large objects such as sofa, curtain, bed sheet and potted plant, and the places of chaos are kitchen, balcony and living room, so the behavior state parameters of the pet are adjusted and controlled to avoid the corresponding road signs.

The laser projector is configured to move a laser beam to form a structural light spot, so that motion state of the pet changes towards the motion state corresponding to the adjusted behavior state parameters in the process of following the structural light spot, and then adjusted behavior state parameters is collected and processed in real time by the primary sensor, and the adjusted motion state is recorded as the historical behavior state. The control device for a robot to tease a pet reduces the interference of the outside road signs by accurately predicting the behavior of the pet. The device has high degree of intelligence of pet training and high integration degree of module units of each internal device, and the stability and real-time performance of the whole system are good.

The control device for a robot to tease a pet further includes a secondary sensor, configured to assist the primary sensor to identify the current motion state of the pet. The secondary sensor includes an infrared camera, configured to sense an additional road sign image corresponding to the home environment where the pet is and transmit the additional road sign image to the behavior interferometer, which is defined in the behavior interferometer as an additional road sign condition of the home environment where the pet is. According to the principle that cats and dogs cannot help themselves when they seeing red, the additional road sign image collected by the infrared camera in the embodiment of the disclosure and the pet image collected under normal conditions are combined into an overall image, and then the overall image is matched with a sample pet behavior image in an animal hunting behavior training database to predict and match a pet behavior and action image; the predicted pet behavior and action image is transmitted to and parameterized in the behavior interferometer to adjust the behavior state parameters that control the state of the pet; then, the adjusted behavior state parameters are transmitted to the laser projector, so as to realize effective training of the pet, avoid the additional road signs in the home environment, at the same time, improve the current motion state of the pet. The secondary sensor assists the primary sensor to set the home environment where the pet is, while considering the trends and patterns of internal and external influences.

Specifically, the behavior state parameters are motion frequency and amplitude of the pet which are obtained by converting and parsing the matched digital image of pet behavior by the state recognizer. Based on the motion frequency and amplitude, the motion trails that may be formed in each motion cycle may be used to analyze the speed of the pet and other parameters. The technical solution may improve the accuracy of analysis through the identification of a pet and the analysis of an image change.

Optionally, the state recognizer is further configured to judge whether the iris image collected by the primary sensor matches with the pre-stored sample pet iris; when the iris image collected by the primary sensor matches with the pre-stored sample pet iris, the digital image of pet behavior corresponding to the matched sample pet iris is parsed into the behavior state parameters. Specifically, first it is judged whether the iris in the eyes of the pet in front of the control device for a robot to tease a pet matches with the stored iris of the pet; then, on the premise of matching, the collected image is transmitted to an image preprocessing software of an iris recognition system; feature points needed for iris recognition are extracted from the iris image using a specific algorithm and then coded; feature codes obtained from feature extraction are matched with the feature codes of iris image in the database one by one to determine whether they are the same iris, and then the current behavior state of the pet is determined in a pet behavior training recognition window, that is, the image corresponding to the behavior state of the pet is sensed. The primary sensor has a higher functional integration level, and better stability and real-time performance, so that the iris recognition is more accurate.

Optionally, the state recognizer further counteracts, through the background, the effect of the additional road sign image sensed by the secondary sensor of the control device for a robot to tease a pet, and uses an image background extraction technology to filter the additional road sign image to obtain a detection image on which the pet is filtered. Because the secondary sensor includes the infrared camera, according to the principle that cats and dogs cannot help themselves when they seeing red, the additional road sign image collected by the infrared camera in the embodiment of the disclosure and the pet image collected under normal conditions are combined into a continuous overall image. By correspondingly matching the continuous overall image with the sample pet behavior image in the animal hunting behavior training database based on texture, shape and position, changes in position or behavior of the pet in a period of time may be obtained. The matched pet behavior and action image is obtained through prediction and parameterized through the behavior interferometer, and then, according to the adjusted behavior state parameters, the laser projector effectively trains the pet and improves the current motion state of the pet on the basis of avoiding the additional road signs in the home environment. The secondary sensor assists the primary sensor to set the home environment where the pet is, while considering the trends and patterns of internal and external influences.

The living room, bedroom, kitchen and others, where the location of the addition road sign image is set, are most likely suspicious places for pets. For the changes of position or shape of a sofa, a curtain, or other objects caused after the pet enters the suspicious place in a short time, it is very likely that the pet is in the behavior of damaging furniture. For the great changes of the image in a very short period of time, it is also possible that the pet is moving quickly to cause the change of the position of household items. In this regard, an abnormal behavior of the pet includes the following characteristics: 1. the pet is within a preset distance of the suspicious locations such as the living room and bedroom; and 2. a grayscale image of shape, color and position of the furniture in the suspect locations changes.

In the embodiments of the disclosure, for the characteristic 1, an independent variable X1 is defined, if the pet appears in the living room, bedroom and other suspicious places, the X1 records a corresponding position offset of the pet in the first frame of image and the last frame of image in the motion cycle; for the characteristic 2, an independent variable X2 is defined as a change value of the grayscale image of shape, color and position of the furniture in the suspicious locations. The degree of abnormality in the behavior of the pet is calculated according to the degree to which the furniture changes in one motion cycle, that is, the independent variable X2 is integrated in time, and then the average offset value is calculated with the offset based on the characteristic 1. If the average offset value exceeds a certain threshold, the laser projector is controlled to project the structure light to lure the pet away from the suspicious places at least a distance greater than the preset distance.

It is to be noted that because the pet must be in the suspicious places to damage the furniture, when the control device for a robot to tease a pet recognizes that the pet enters the suspicious places, the state recognizer starts to judge the matching of the image changes. An analysis of the changes of furniture when the pet is in the suspicious locations can tell if the pet behaves abnormally.

In the case of the abnormal behavior of the pet, the state recognizer is further configured to counteract the effect of the additional road sign image through the background, extract the pet motion image continuously collected by the primary sensor, perform corresponding matching between the continuously collected images, obtain the changes of the structural light spot in the motion cycle, and analyze according to the changes of the structural light spot to obtain the behavior of the pet to the structural light spot. In this way, that the pet behavior state parameters output by the state recognizer are interfered, resulting in misjudgment and missed detection, is avoided.

Optionally, the laser projector includes a laser sensor which emits a laser signal in an infrared band by means of modulation. The technical solution uses the structured light of the laser projector, which is better for attracting the attention of a pet. The laser sensor is specifically configured to plan the motion track of the pet by controlling the movement of the structural light spot. The embodiments of the disclosure use the structured light of laser projection. The laser beam forms a light spot to attract the pet's attention. The light spot is moved by controlling the laser sensor to rotate, that is, by rotating a laser emitting part and a laser receiving part inside it to scan. In the scanning process of the laser sensor, a center coordinate of the pet may be obtained by scanning to form a coordinate map that guides the pet behavior state in each preset time interval. According to the coordinate values continuously recorded in two coordinate maps at two different times, the amount of movement of the pet center is calculated, and then a moving speed of the pet is measured and transmitted to the behavior interferometer. The behavior interferometer records the historical behavior state of the pet, and the behavior state parameters of the pet transmitted by the state recognizer are supplemented to improve the accuracy of the control device for a robot to tease a pet to identify the behavior state of the pet.

The laser emitted by the laser sensor can not only simulate a predation behavior in the real nature and adjust a motion posture according to the motion amplitude of the pet, but also use the laser to simulate an escaping behavior of the prey to guide the pet to chase, and then the attention of the pet is attracted, and the pet is guided to chase and play, so as to control and improve the behavior state of the pet. At this point, the primary sensor and the secondary sensor may match a skill level and movement style of the pet by collecting the size and speed of the pet and other parameters, so as to prevent cats and dogs from jumping up and down and making a mess. The laser emitted by the laser sensor can not only simulate a predation behavior in the real nature, but also adjust a motion posture according to the motion amplitude of the pet, and analyze the size and speed of your pet and other parameters, so as to match a skill level and movement style of your pet.

Figure 2:
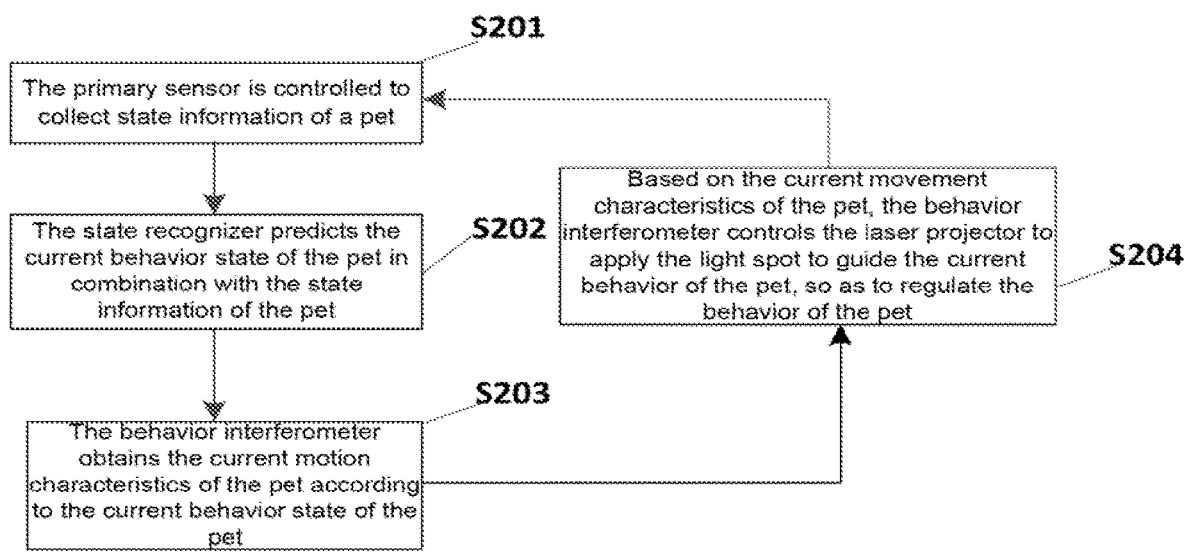
FIG. 2 is a flowchart of a control method for a robot to tease a pet provided in an embodiment of the disclosure.

As shown in FIG. 2, a control method for a robot to tease a pet based on the control device for a robot to tease a pet includes the following steps. At S201, the primary sensor is controlled to collect state information of a pet, that is, the primary sensor continuously collects a preset number of frames of pet motion images in the current motion cycle of the pet. The motion cycle is related to the unique living habits of the pet, and the preset number of frames of pet motion images matches with the motion frequency of the pet. Then, S202 is performed, and the pet motion images are transmitted to the state recognizer to comprehensively evaluate the current behavior state of the pet.

At S202, the state recognizer predicts the current behavior state of the pet in combination with the state information of the pet. The state recognizer judges the matching between the pet motion images continuously collected by the primary sensor and the pre-stored digital image of pet behavior, and then S203 is performed. Specifically, it is judged whether the pet motion images continuously collected by the primary sensor in the current motion cycle match with the pre-stored digital image of pet behavior; when the pet motion images continuously collected by the primary sensor in the current motion cycle match with the pre-stored digital image, the matched digital image of pet behavior is parsed into the behavior state parameters of the pet, and the behavior state parameters are transmitted to the behavior interferometer; and then, the matched digital image of pet behavior is parsed into the current behavior state parameters of the pet; or else, the next motion cycle is waited and then the operations of capturing and judging the matching are performed.

At S203, the behavior interferometer obtains the current motion characteristics of the pet according to the current behavior state of the pet, and then S204 is performed. Specifically, on the premise of comparing the historical behavior state of the pet (including the behavior state parameters of the pet transmitted by the state recognizer), the behavior interferometer adjusts and controls the behavior state parameters of the pet according to the additional road sign condition of the home environment where the pet is, so as to avoid the additional road signs of the home environment. Generally speaking, the objects destroyed by the pet are large objects such as sofa, curtain, bed sheet and potted plant, and the places of chaos are kitchen, balcony and living room, so the behavior state parameters of the pet are adjusted and controlled to avoid the corresponding road signs.

At S204, based on the current movement characteristics of the pet, the behavior interferometer controls the laser projector to apply the light spot to guide the current behavior of the pet, so as to improve the behavior of the pet; then, S201 is returned. According to the adjusted behavior state parameters, the structural light spot formed by the laser beam projected by the laser projector is moved to make the pet change toward the motion state corresponding to the adjusted behavior state parameters in the process of following the structural light spot; then, the control device for a robot to tease a pet enters the next motion cycle of the pet, and S201 is returned. The control device for a robot to tease a pet realizes effective training of the pet through accurate prediction of the behavior of the pet, reduces the damage of the pet to furniture, and saves the time and energy of pet owners.

Optionally, the behavior state parameters are motion frequency and amplitude of the pet which are obtained by converting and parsing the matched digital image of pet behavior by the state recognizer. Based on the motion frequency and amplitude, the motion trails that may be formed in each motion cycle may be used to analyze the speed of the pet and other parameters. The technical solution may improve the accuracy of analysis through the identification of a pet and the analysis of an image change.

Optionally, the laser projector plans a motion track of the pet by controlling the movement of the structural light spot and then scan a coordinate map for detecting the behavior state of the pet in each preset time interval, calculate the amount of movement according to the two coordinate maps at two different times and then measure a moving speed of the pet. The embodiments of the disclosure use the structured light of laser projection. The laser beam forms a light spot to attract the pet's attention. The light spot is moved by controlling the laser sensor to rotate, that is, by rotating a laser emitting part and a laser receiving part inside it to scan. In the scanning process of the laser sensor, the coordinate map for guiding the behavior state of the pet is formed by scanning in each preset time interval, and the coordinate map of continuous points on the surface for guiding the pet is also generated. A contour coordinate of the pet and the center coordinate of the pet may be obtained on the coordinate map. According to the coordinate values continuously recorded in two coordinate maps at two different times, the amount of movement of the pet center is calculated, and then a moving speed of the pet is measured. The behavior interferometer records the historical behavior state of the pet, and the behavior state parameters of the pet transmitted by the state recognizer are supplemented to improve the accuracy of the control device for a robot to tease a pet to identify the behavior state of the pet.

A mobile robot is provided, in which the control device for a robot to tease a pet is built for training a pet. When a pet is in a cycle time, the mobile robot contacts and interacts with the pet, constantly records motion trails of the pet formed in each cycle time, and adjusts and controls the motion frequency and amplitude of the pet; furthermore, the integration degree of module units of each internal device is increased. In this way, the stability and real-time performance of the whole robot system are improved.

Finally, it is to be noted that the above embodiments are used only to describe, but not limit, the technical solution of the disclosure. Although the disclosure has been described in detail with reference to preferred embodiments, those of ordinary skill in the art should understand that the specific embodiments of the disclosure may still be modified or some of the technical features may be equivalently replaced without departing from the spirit of the technical solution of the disclosure, and any modifications and equivalent replacements should be included in the scope of the technical solution claimed by the disclosure.

What is claimed is:

1. A control device for a robot to tease a pet, comprising:
the primary sensor, configured to continuously collect a preset number of frames of pet motion images in each motion cycle and transmit them to the state recognizer in turn;
the state recognizer, configured to judge the matching between the pet motion images continuously collected by the primary sensor and a pre-stored digital image of pet behavior, and then parse the matched digital image of pet behavior into behavior state parameters of a pet and transmit the behavior state parameters to the behavior interferometer;
the behavior interferometer, configured to adjust the behavior state parameters that control the state of the pet according to an additional road sign condition of the home environment where the pet is and according to historical behavior state of the pet, so as to avoid additional road signs of the home environment, and transmit the adjusted behavior state parameters to the laser projector, the additional road sign of the home environment is an object that is at risk of being destroyed in the home environment;

the laser projector, configured to move a laser beam to form a structural light spot, so that motion state of the pet changes towards the motion state corresponding to the adjusted behavior state parameters in the process of following the structural light spot, and then adjusted behavior state parameters is collected and processed in real time by the primary sensor, and the adjusted motion state is recorded as the historical behavior state;

the control device for a robot to tease a pet further comprises a secondary sensor, configured to assist the primary sensor to identify the current motion state of the pet; wherein the secondary sensor comprises an infrared camera, configured to sense an additional road sign image corresponding to the home environment where the pet is and transmit the additional road sign image to the behavior interferometer, which is defined in the behavior interferometer as an additional road sign condition of the home environment where the pet is.

2. The control device for a robot to tease a pet according to claim 1, wherein the behavior state parameters are motion frequency and amplitude of the pet which are obtained by converting and parsing the matched digital image of pet behavior by the state recognizer.

3. The control device for a robot to tease a pet according to claim 1, wherein the primary sensor comprises an iris camera, configured to capture the iris in the pet's eyes to sense the image corresponding to the behavior state of the pet.

4. The control device for a robot to tease a pet according to claim 3, wherein the state recognizer is further configured to judge a matching degree between an iris image collected by the iris camera and a pre-stored sample pet iris.

5. The control device for a robot to tease a pet according to claim 1, wherein the state recognizer is further configured to counteract the effect of the additional road sign image through the background, extract the pet motion image continuously collected by the primary sensor, perform corresponding matching between the continuously collected images, obtain the changes of the structural light spot in the motion cycle, and analyze according to the changes of the structural light spot to obtain the behavior of the pet to the structural light spot.

6. The control device for a robot to tease a pet according to claim 1, wherein the laser projector comprises a laser sensor which emits a laser signal in an infrared band by means of modulation.

7. The control device for a robot to tease a pet according to claim 6, wherein the laser sensor is specifically configured to plan a motion track of the pet by controlling the movement of the structural light spot and then scan a coordinate map for detecting the behavior state of the pet in each preset time interval, calculate the amount of movement according to the two coordinate maps at two different times and then measure a moving speed of the pet, and transmit the moving speed to the behavior interferometer; the behavior interferometer records the moving speed as the historical behavior state of the pet.

8. A mobile robot, wherein the control device for a robot to tease a pet comprises:

the primary sensor, configured to continuously collect a preset number of frames of pet motion images in each motion cycle and transmit them to the state recognizer in turn;

the state recognizer, configured to judge the matching between the pet motion images continuously collected by the primary sensor and a pre-stored digital image of pet behavior, and then parse the matched digital image of pet behavior into behavior state parameters of a pet and transmit the behavior state parameters to the behavior interferometer;

the behavior interferometer, configured to adjust the behavior state parameters that control the state of the pet according to an additional road sign condition of the home environment where the pet is and according to historical behavior state of the pet, so as to avoid additional road signs of the home environment, and transmit the adjusted behavior state parameters to the laser projector, the additional road skin of the home environment is an object that is at risk of being destroyed in the home environment;

the laser projector, configured to move a laser beam to form a structural light spot, so that motion state of the pet changes towards the motion state corresponding to the adjusted behavior state parameters in the process of following the structural light spot, and then adjusted behavior state parameters is collected and processed in real time by the primary sensor, and the adjusted motion state is recorded as the historical behavior state;

the control device for a robot to tease a pet further comprises a secondary sensor, configured to assist the primary sensor to identify the current motion state of the pet; wherein the secondary sensor comprises an infrared camera, configured to sense an additional road sign image corresponding to the home environment where the pet is and transmit the additional road sign image to the behavior interferometer, which is defined in the behavior interferometer as an additional road sign condition of the home environment where the pet is.

9. A mobile robot according to claim 8, wherein the behavior state parameters are motion frequency and amplitude of the pet which are obtained by converting and parsing the matched digital image of pet behavior by the state recognizer.

10. A mobile robot according to claim 8, wherein the primary sensor comprises an iris camera, configured to capture the iris in the pet's eyes to sense the image corresponding to the behavior state of the pet.

11. A mobile robot according to claim 8, wherein the state recognizer is further configured to judge a matching degree between an iris image collected by the iris camera and a pre-stored sample pet iris.

12. A mobile robot according to claim 8, wherein the state recognizer is further configured to counteract the effect of the additional road sign image through the background, extract the pet motion image continuously collected by the primary sensor, perform corresponding matching between the continuously collected images, obtain the changes of the structural light spot in the motion cycle, and analyze according to the changes of the structural light spot to obtain the behavior of the pet to the structural light spot.

13. A mobile robot according to claim 12, wherein the laser sensor is specifically configured to plan a motion track of the pet by controlling the movement of the structural light spot and then scan a coordinate map for detecting the behavior state of the pet in each preset time interval, calculate the amount of movement according to the two coordinate maps at two different times and then measure a moving speed of the pet, and transmit the moving speed to the behavior interferometer; the behavior interferometer records the moving speed as the historical behavior state of the pet.

14. A mobile robot according to claim 8, wherein the laser projector comprises a laser sensor which emits a laser signal in an infrared band by means of modulation.

\* \* \* \* \*